United States Patent [19]

Shipman

[11] Patent Number: 5,033,088

[45] Date of Patent: Jul. 16, 1991

[54] METHOD AND APPARATUS FOR EFFECTIVELY RECEIVING VOICE INPUT TO A VOICE RECOGNITION SYSTEM

[75] Inventor: David W. Shipman, Cambridge, Mass.

[73] Assignee: Voice Processing Corp., Washington, D.C.

[21] Appl. No.: 453,108

[22] Filed: Dec. 21, 1989

Related U.S. Application Data

[63] Continuation of Ser. No. 202,506, Jun. 6, 1988, abandoned.

[51] Int. Cl.⁵ .......................... G10L 5/00; H04M 3/50
[52] U.S. Cl. .......................................... 381/43; 379/88
[58] Field of Search ................. 364/513.5; 381/41–43; 379/88, 89

[56] References Cited

U.S. PATENT DOCUMENTS

| | | | |
|---|---|---|---|
| 4,462,080 | 7/1984 | Johnstone et al. | 364/513.5 |
| 4,475,189 | 10/1984 | Herr et al. | 379/88 |
| 4,593,157 | 6/1986 | Usdan | 379/89 |
| 4,618,984 | 10/1986 | Das et al. | 381/43 |
| 4,651,289 | 3/1987 | Maeda et al. | 364/513.5 |
| 4,827,500 | 5/1989 | Binkerd et al. | 379/88 |

OTHER PUBLICATIONS

Jones, "Building Block Circuits Simplify Integration on Voice-Input Systems", Computer Technology Review; Los Angeles, CA, U.S.A., Jan. 3, 1983; No. 1, pp. 63–67.

Primary Examiner—Gary V. Harkcom
Assistant Examiner—David D. Knepper
Attorney, Agent, or Firm—Fleit, Jacobson, Cohn, Price, Holman & Stern

[57] ABSTRACT

Processing voice information is performed to complete a task with minimal human intervention. Information received by the automated system from the caller is fed into a speech recognition system, which attempts to recognize the information. The caller's input also is recorded by a recording device. The task is completed if the information is reliably recognized. If the information is not reliably recognized, the speech recognition system optionally requests that the information be repeated. The repeated information is received by the system, and the speech recognition system again attempts to identify the information. The task is completed if the repeated information is reliably recognized. If the repeated information is again not reliably recognized by the speech recognition system, and usually without the caller knowing, the spoken information is transmitted to a human attendant who attempts to identify the information by a playback of the recorded information and possibly a visual display of the speech recognition system's proposed solution to what the caller stated. If the caller's information is recognized, the human attendant then inputs the information so that the system can complete the task. If the human attendant is also unable to recognize the information, the attendant directly requests further information from the caller until the desired information is received.

5 Claims, 2 Drawing Sheets

METHOD AND APPARATUS FOR EFFECTIVELY RECEIVING VOICE INPUT TO A VOICE RECOGNITION SYSTEM

This application is a continuation of application Ser. No. 07/202,506, filed Jun. 6, 1988, now abandoned.

BACKGROUND OF THE INVENTION

This invention relates generally to systems in which a speech recognition device is utilized to receive spoken information from an incoming caller, process the information, and complete a predetermined task.

The use of automated speech recognition devices to process spoken information received over telephone lines is well known and is becoming increasingly popular. It should be clear that if such an automated speech recognition device is utilized, it is very important that the speaker communicates accurate information to the system, and does so with maximum machine assistance to the speaker. And, if the speech recognition device is unable to satisfactorily identify information presented by the caller, it is important that the caller be prompted as few times as possible to repeat the questionable information. At the same time, it is essential that accurate information be received and processed by the device.

Accordingly, it is an object of this invention to provide an automatic speech recognition system for receiving and processing voice-communicated information from a human in an efficient and pleasing manner.

Other objects and advantages of the invention will become apparent from the following detailed description when considered in conjunction with the accompanying drawings.

SUMMARY OF THE INVENTION

According to the invention, there is provided a method and apparatus for processing spoken information so that an automated system is able to complete a task with minimal contact with a caller. This method, and its associated apparatus, comprises receiving verbal information from the caller, attempting to recognize the information and completing the task if the information is recognized. All spoken information from the caller is recorded by the recognition system.

If the spoken information is not recognized by the automated speech recognition system, then the system automatically and without the knowledge of the caller switches to a mode that includes the intervention of a human attendant. Even then, the entire transaction generally proceeds without the caller ever knowing that a human has intervened.

The human attendant could receive two types of information from the automated system. The first is a screen display showing the recognition system's possible "solutions" for the caller's spoken information. The second is the recorded utterance that is played for the attendant over an audio playback device.

The human attendant could therefore view the display of the most likely identity (or identities) of the repeated information and could also listen to the verbal input to determine whether or not the input is recognizable. If the recorded information is recognizable, the attendant inputs the recognized information (via a keyboard or other input device) into the system so that the system may complete the given task. The screen display is designed to facilitate the input of information by the attendant (as by permitting the input of a full word by means of single character). If, on the other hand, the recorded information cannot be recognized by the human attendant, the attendant may cut in and communicate with the caller directly in order to gain an understanding of the previously unrecognized information; this would be the only circumstance under which the caller will know that an attendant has intervened. The attendant then inputs the proper information into the system, which then completes the given task.

DETAILED DESCRIPTION OF THE PREFERRED EMBODIMENT

Figure 1:
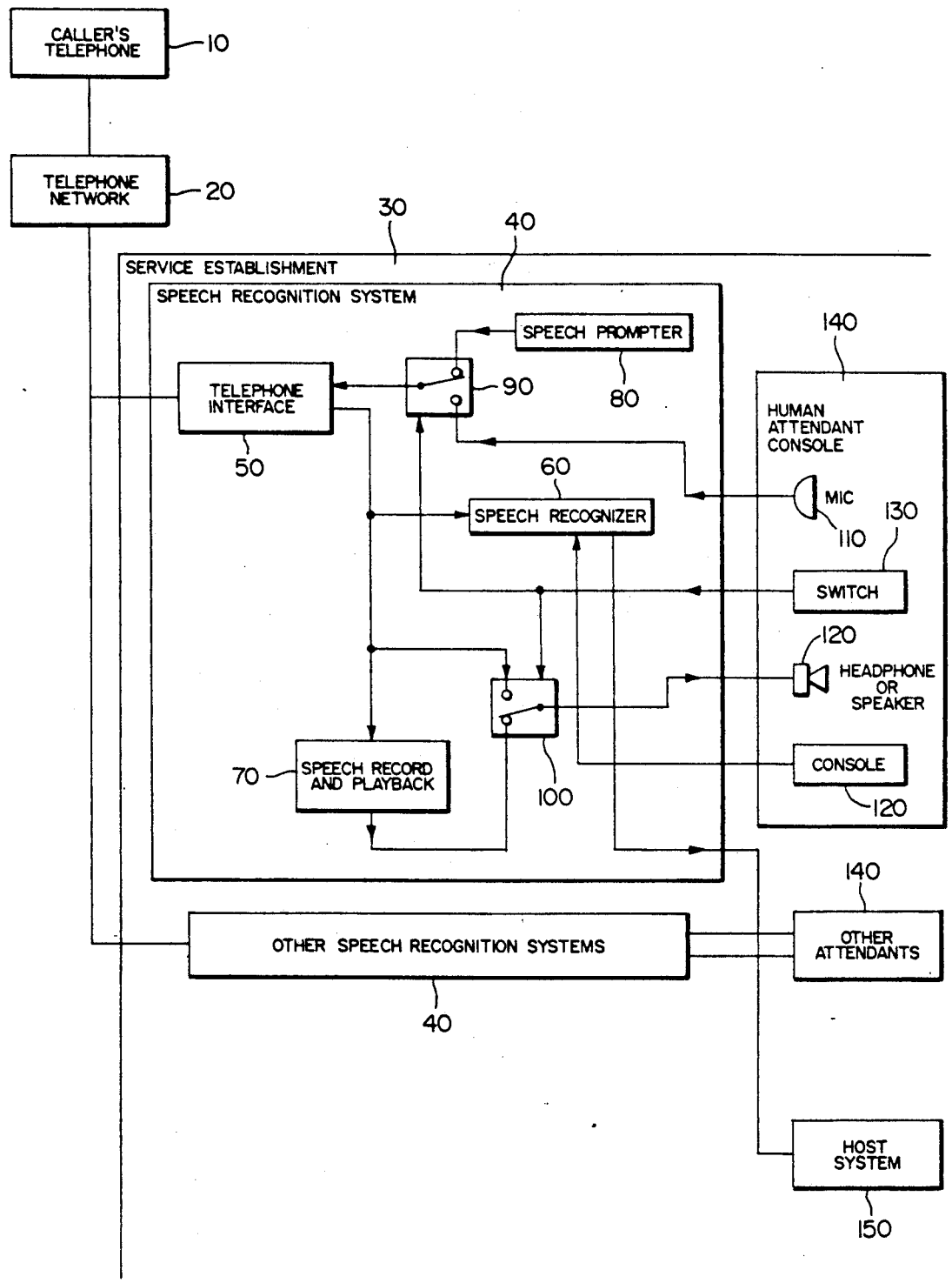
FIG. 1 is a block diagram of the voice recognition system of the present invention.

FIG. 1 schematically illustrates at 5 the elements which comprise the automated speech recognition apparatus of the invention. FIG. 1 shows a caller's telephone 10 connected by a telephone line through the telephone network 20 to a speech recognition system 40 at a given service establishment 30. Within the automated speech recognition system is a recorder or other audio recording device 70 such as a disc drive or electronic memory. Recorder 70 can provide recorded voice information to a human attendant at console 140 via a headphone or speaker 120. Depending on the ability of the automated speech recognition system to identify information provided by the caller, either the speech recognition system 40 or the human attendant at console 140 will determine what information was spoken by the caller.

The speech recognition apparatus illustrated in FIG. 1 operates generally as follows. The caller is prompted for information by a known speech prompter 80, and the caller's spoken words are processed by a known speech recognizer 60. At the same time, the caller's response is recorded by recording and playback device 70. If the speech recognizer 60 recognizes the caller's response, it will provide a signal via known means and in a known manner to the host system 150 to complete the task.

Several methods can be used by the recognition system to determine if the information spoken by the caller was correctly recognized. They include the following, as examples:

(1) The recognition device calculates and assigns a probability of correctness to its estimate of information spoken by the caller.
(2) If the utterance is a digit string, a check-sum of digits is computed.
(3) If the recognition device proposes a word that does not conform to the expected caller responses, an error assumption is made.

In the event the speech recognition system 40 fails to recognize the caller's response, an error is detected, the task is not completed, and the caller's recorded response and the recognizer's proposed response or responses are presented to the human attendant at console 140 via headphone or speaker 120 and operator's console 160. Based upon the information presented, the human attendant at console 140 can either complete the task, if the request is understood, or alternatively, switching means 90 and 100 can be utilized so that the human attendant can speak with and listen to the caller via microphone 110 and headphone or speaker 120, if the recorded response is not understood, in order to ascertain precisely what was the caller's response.

Figure 2:
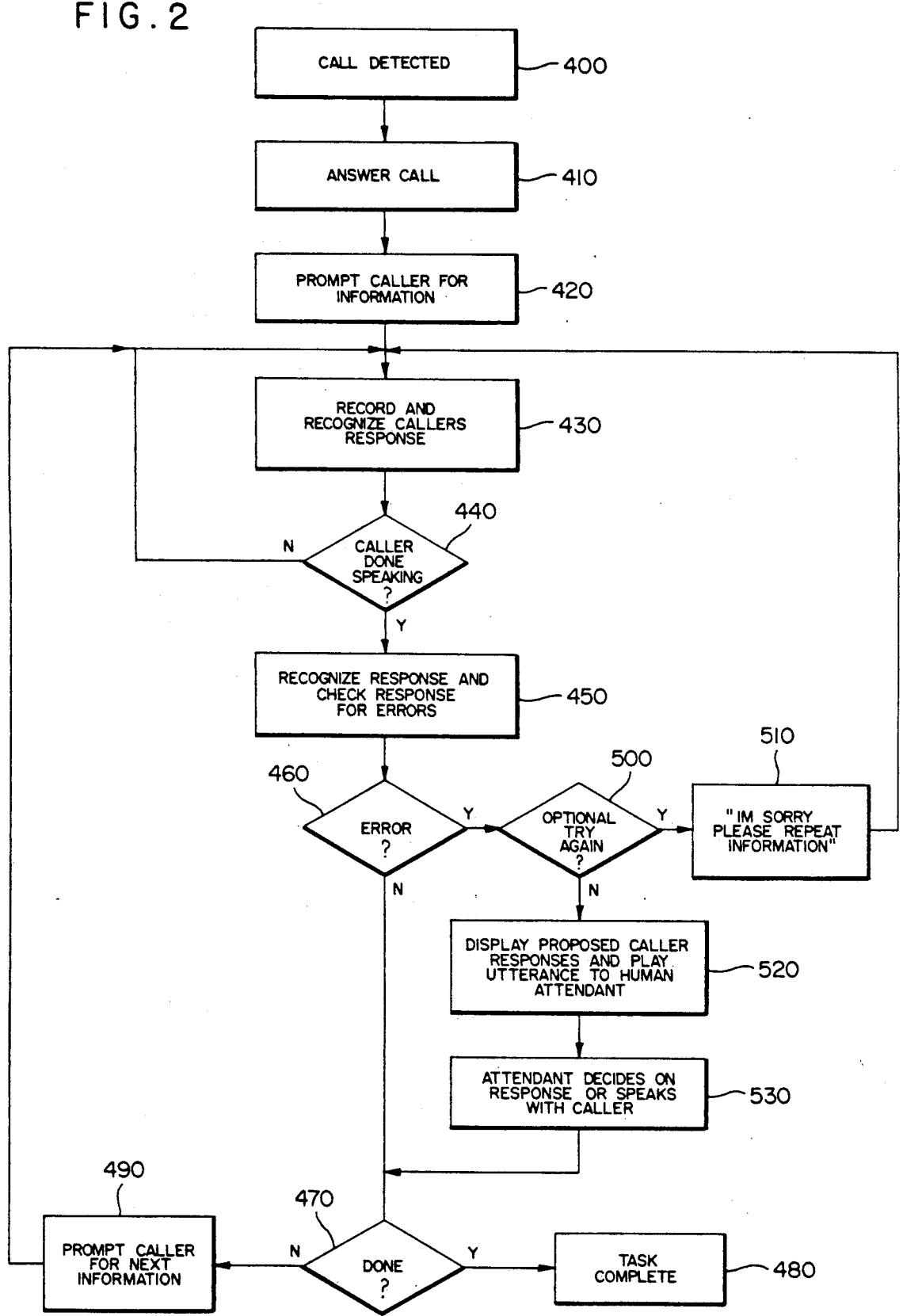
FIG. 2 is flow diagram of the voice recognition system depicted in FIG. 1.

Referring now to FIG. 2, the process by which the automated system described above deals with an incoming call is illustrated step by step. When an incoming telephone call is detected by the automated system, the call is automatically answered by telephone interface 50 at step 410. The caller is prompted at step 420 by the automated system to provide information which the system 40 will attempt to recognize. The caller then speaks, thereby providing the system with verbal information. The system receives and records the verbal information at step 430 and waits for the caller to finish speaking at step 440. The speech recognizer 60 recognizes the speech and checks for errors at step 450. If the speech recognizer 60 determines it has correctly recognized the caller's verbal request, it then is able to signal the host system 150 to complete the task the caller desires. In the event that the speech recognizer 60 determines it has not correctly recognized the verbal request made by the caller, the caller is optionally prompted once again at step 500 to repeat the information originally provided to the system. The repeated information is again received and recorded at step 430 by the system.

If, at step 450, the speech recognizer 60 determines that it correctly recognizes the verbal request based upon the information repeated by the caller, the speech recognition system 40 will complete the task requested. In the event that the speech recognizer 60 determines it has again failed to recognize the verbal request, there is now no need to ask for an additional repeated request from the caller. Instead the information which was previously recorded by speech record and playback device 70 is repeated at step 520 over headphone or speaker 120 so that the human attendant at console 140 is able to hear the repeated and recorded information. The recognizer 60 also displays on operator's console 160 proposed solutions to what the caller said.

If, at step 530, the human attendant 140 is able to determine from hearing the recorded, repeated information what was said by the caller, the human attendant enters or corrects the information at the console 160. The attendant, for example, may use a keyboard to input information into console 160. The information is transmitted from console 160 to speech recognizer 60, which then completes the task. Alternatively, in the event that the human attendant is unable at step 530 to recognize the repeated information, he or she may cut in on the line with the caller and assist the caller by asking for further information.

Most caller phone calls will be serviced by the speech recognition system 40 and host system 150 without the need of a human attendant. This allows one attendant to service many speech recognizers or, alternatively, the attendant could be occupied with other activities when not servicing speech recognizer requests for attendant intervention.

Attendants can be connected to any recognition system via known network or switching means allowing any recognizer with a need for attendant intervention to be connected to any free attendant for resolution of a recognition task.

The foregoing is considered as illustrative of the invention. Since numerous modifications and changes may occur to those skilled in the art, it is to be understood that the invention is not to be limited to the exact construction and operation shown and described.

What is claimed:

1. A method of processing verbal information received by an automated voice recognition system from a customer and completing a task on the basis of the information received, the method comprising the steps of:

prompting a verbal response from a human customer as an input source;

receiving information in the verbal response from the input source generated by the human customer, said information corresponding to a desired task to be completed;

recording the verbal response;

attempting to recognize said information through automation;

determining by automation if the information was reliably recognized;

transmitting the recorded verbal response of the human customer to a human attendant other than the human customer if it is determined that said information was not reliably recognized;

inputting correct information by the human attendant so as to enable the completion of the desired task through automation; and completing the desired task with the automatically recognized information if it is determined that said information was reliably recognized or with the human attendant inputted information if it is determined that said information was not reliably recognized.

2. A method as defined by claim 1 and further comprising the step of:

prompting a repeated verbal response from the human input source.

3. An apparatus for processing verbal information from a customer to complete a task comprising:

means for prompting a verbal response from a human customer as an input sources;

a speech recognizer including means for recognizing information in the verbal response and means for determining if the information was reliably recognized;

recording means for recording the verbal response;

means for enabling information to be manually input into the speech recognition system; and means for completing the task automatically if the information was reliably recognized by said speech recognizer, said means for completing the task completes the task with the recognized information, and including means for manually completing the task if the information was not reliably recognized by said speech recognizer, said means for completing the task completes the task with the information inputted by a human attendant other than the human customer after reviewing the recorded verbal response.

4. A method of processing verbal information received by an automated voice recognition system to complete a task, said method comprising the steps of:

prompting a verbal response from a human customer source, said verbal response including information for carrying out a specific task;

receiving said information in said verbal response from said human customer source;

recording said verbal response;

attempting to recognize said information via said voice recognition system;

determining if said information is either recognizable or unrecognizable by said voice recognition system; and carrying out said specific task directly if said information is recognizable on the one hand, or on the other hand, transmitting said recorded verbal response to a human attendant other than the human customer if said information is unrecognizable, to allow said human attendant to provide the information corresponding to said specific task to enable completion of said specific task.

5. An apparatus for processing verbal information for completing a task comprising:

means for prompting a verbal response from a human customer as an input source;

speech recognizing means for attempting to recognize information in said verbal response and including means for determining if said information is recognizable or unrecognizable;

recording means for recording the verbal response;

means for completing said task;

means for enabling said information to be manually input by a human attendant other than the human customer to trigger said means for completing the task to complete the task if said information is unrecognizable, on the one hand, or on the other hand, for triggering directly said means for completing the task to complete the task if said information is recognizable.

* * * * *